(12) United States Patent
Aanenson

(10) Patent No.: US 9,445,583 B1
(45) Date of Patent: Sep. 20, 2016

(54) DEEP SEA FISHING LURE

(71) Applicant: Eric E Aanenson, Kihei, HI (US)

(72) Inventor: Eric E Aanenson, Kihei, HI (US)

( * ) Notice: Subject to any disclaimer, the term of this patent is extended or adjusted under 35 U.S.C. 154(b) by 511 days.

(21) Appl. No.: 14/029,117

(22) Filed: Sep. 17, 2013

Related U.S. Application Data

(63) Continuation-in-part of application No. 10/773,504, filed on Feb. 6, 2004, now Pat. No. 8,533,990.

(60) Provisional application No. 60/446,766, filed on Feb. 11, 2003.

(51) Int. Cl.
*A01K 85/01* (2006.01)

(52) U.S. Cl.
CPC ..................... *A01K 85/01* (2013.01)

(58) Field of Classification Search
CPC ............... A01K 85/01; A01K 85/00
See application file for complete search history.

(56) References Cited

U.S. PATENT DOCUMENTS

| | | | |
|---|---|---|---|
| 3,952,445 A | 4/1976 | Liebert | |
| 4,175,348 A | 11/1979 | Ray | |
| 4,250,650 A * | 2/1981 | Fima | A01K 85/01 43/17.6 |
| 4,347,681 A * | 9/1982 | Fima | A01K 85/01 43/17.6 |
| 4,516,350 A | 5/1985 | Malphrus | |
| 4,727,674 A | 3/1988 | Garr | |
| 4,741,120 A * | 5/1988 | Cota | A01K 85/01 43/17.5 |
| 4,799,327 A * | 1/1989 | Treon | A01K 85/01 43/17.6 |
| 4,811,513 A * | 3/1989 | Grobl | A01K 85/01 43/17.6 |
| 4,888,905 A * | 12/1989 | Garr | A01K 85/01 43/17.6 |
| 5,063,700 A * | 11/1991 | Kiefer | A01K 91/06 43/17.5 |
| 5,175,951 A * | 1/1993 | Fruchey | A01K 85/01 43/17.6 |
| 5,330,282 A * | 7/1994 | Rodgers | A01K 85/01 43/17.6 |
| 5,392,555 A * | 2/1995 | Tingey | A01K 85/01 43/17.6 |
| 5,697,182 A * | 12/1997 | Rodgers | A01K 85/01 43/17.1 |
| D429,310 S * | 8/2000 | DiLiberti | D22/128 |
| 6,393,757 B2 * | 5/2002 | Bomann | A01K 85/16 43/42.09 |
| 6,581,319 B2 * | 6/2003 | West | A01K 85/01 43/17.1 |
| 6,647,659 B1 * | 11/2003 | King | A01K 85/01 43/17.6 |
| 8,910,415 B2 * | 12/2014 | Farr, Jr. | A01K 85/00 43/42.06 |
| 2001/0013193 A1 * | 8/2001 | Schultz | A01K 85/01 43/17.6 |
| 2003/0182841 A1 * | 10/2003 | Calak, Jr. | A01K 85/01 43/17.6 |
| 2004/0200122 A1 * | 10/2004 | Aanenson | A01K 85/00 43/17.6 |
| 2006/0005455 A1 * | 1/2006 | Berge | A01K 85/12 43/42.06 |
| 2007/0223220 A1 * | 9/2007 | Flagle | A01K 85/01 362/232 |
| 2009/0013583 A1 * | 1/2009 | Leung | A01K 85/01 43/17.5 |
| 2009/0210247 A1 * | 8/2009 | Chudy | G06F 19/3462 705/2 |
| 2012/0005940 A1 * | 1/2012 | Thomas | A01K 85/01 43/17.1 |
| 2012/0144723 A1 * | 6/2012 | Davidson | A01K 85/01 43/17.6 |
| 2015/0250154 A1 * | 9/2015 | Hamaguchi | A01K 91/08 43/42.1 |
| 2015/0269477 A1 * | 9/2015 | Finn | G06K 19/07794 235/492 |

* cited by examiner

*Primary Examiner* — Gary Hoge

(74) *Attorney, Agent, or Firm* — Michael A. Bondi; Moss & Barnett

(57) ABSTRACT

A deep sea fishing lure including a lure body, a plurality of lights, a power source and a controller. The lure body has a housing with sidewalls made of a generally light-transmissive material. The plurality of lights is mounted in the housing. Each light in the plurality of lights is capable of emitting at least two colors. The power source is mounted with respect to the housing. The controller operably connects the power source to the plurality of lights for controlling which of the at least two colors are emitted by the plurality of lights.

24 Claims, 9 Drawing Sheets

DEEP SEA FISHING LURE

REFERENCE TO RELATED APPLICATION

This application is a continuation-in-part of U.S. application Ser. No. 10/773,504, which was filed on Feb. 6, 2004. This application also claims the benefit of U.S. Applic. No. 60/446,766, which was filed Feb. 11, 2003. The contents of these patent applications are incorporated herein by reference.

FIELD OF THE INVENTION

The invention relates generally to devices that are used to catch fish. More particularly, the invention relates to deep sea fishing lures.

BACKGROUND OF THE INVENTION

Deep sea fishing game fish are commonly found at depths beyond the reach of ambient sunlight encountered at the ocean surface. For example, large tuna can be found at depths of 250 feet.

Artificial lures are commonly used in deep sea fishing. The artificial lures typically appeal to one or more senses of the fish, including the sense of sight. Such lures are configured to resemble prey or food of the type favored by the game fish.

Visual attraction to the fish is important. However, at depths where the large game fish are encountered, there is little ambient light. At best, an unlighted lure is illuminated on the top surface of the lure body by sunlight. At depth, the lure is hard to see by the game fish.

Prior art fishing lures are known to include a flashing, light emitting diode display. For example, such a lure is shown in Fruchey, U.S. Pat. No. 5,175,951.

SUMMARY OF THE INVENTION

An embodiment of the invention is directed to a deep sea fishing lure that includes a lure body, a plurality of lights, a power source and a controller. The lure body includes a housing with sidewalls made of a generally light-transmissive material.

The plurality of lights is mounted in the housing. Each light in the plurality of lights is capable of emitting at least two colors. The power source is mounted with respect to the housing. The controller operably connects the power source to the plurality of lights for controlling which of the at least two colors are emitted by the plurality of lights.

Another embodiment of the invention is directed to a method of deep sea fishing. A deep sea fishing lure is provided that includes a lure body, a plurality of lights, a power source and a controller. The lure body has a housing with sidewalls made of a generally light-transmissive material. The plurality of lights is mounted in the housing. Each light in the plurality of lights is capable of emitting at least two colors.

The power source is mounted with respect to the housing and wherein the controller operably connects the power source to the plurality of lights for controlling which of the at least two colors are emitted by the plurality of lights.

At least one of a hook and a leader is attached to the deep sea fishing lure. The environmental conditions in which the deep sea fishing lure will be used are determined. The controller is used to cause the plurality of lights to emit one color of the at least two colors based upon the determined environmental conditions. The deep sea fishing lure is placed in a body of water.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE INVENTION

Figure 1:
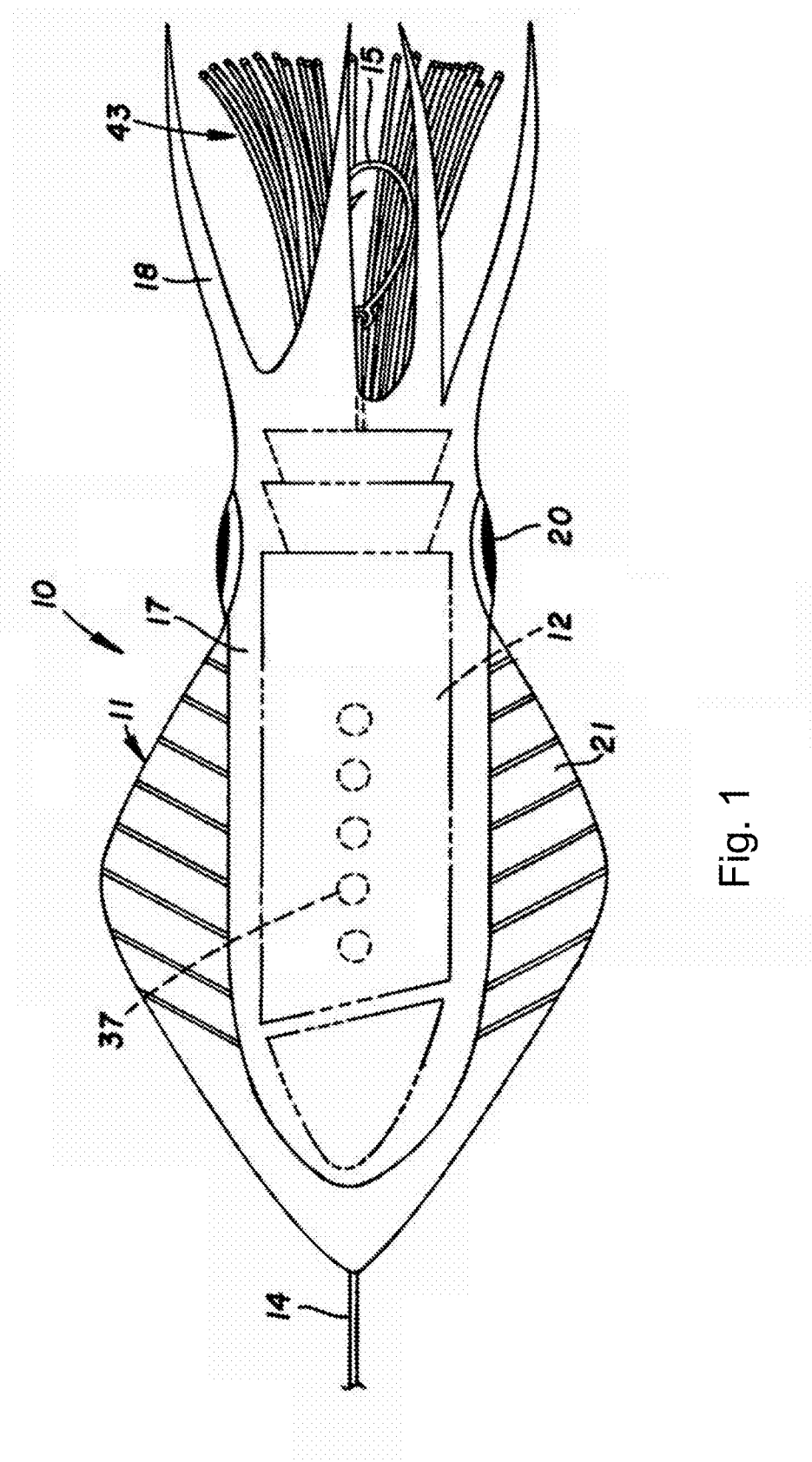
FIG. 1 is a side elevational view of the deep sea fishing lure according to one embodiment of the invention, this embodiment having an outer jacket configured to resemble a squid.

Referring now to the drawings, FIG. 1 shows a deep sea fishing lure according to one embodiment of the invention indicated generally at 10. The deep sea fishing lure 10 includes a jacket 11 and a lure body 12. The jacket 11 is formed of a light-transmissive material such as a clear soft rubber. In certain embodiments, the jacket 11 substantially covers the lure body 12.

As used herein, deep sea fishing means fishing at a depth that is below surface waters at which sunlight reaches. This upper level of water is referred to at the epipelagic zone, which extends to a depth of about 650 feet. In other embodiments, the deep sea fishing lure 10 may be intended for use at a depth of between about 150 feet and about 200 feet.

The deep sea is a hostile environment with temperatures that can reach less than about 3° C., low oxygen levels and pressures that are typically greater than about 20 atmospheres. In certain locations, the pressure is between about 20 atmospheres and about 100 atmospheres. The deep sea fishing lure is capable of being operated under these conditions without experiencing damage.

In particular, the conditions associated with deep sea fishing present challenges associated with controls on the deep sea fishing lure 10. Accordingly, in some embodiments, the deep sea fishing lure 10 is formed without a power switch on the surface of the deep sea fishing lure 10.

Since it is not desirable for the deep sea fishing lure to remain illuminated at all times, the deep sea fishing lure 10 utilizes alternative mechanisms to control the illumination of the lights thereon such as are described herein.

A leader wire 14 passes centrally through the lure body 12 to a fish hook 15. In this particular embodiment the jacket 11 is configured to resemble a squid, a favored form of prey for certain deep sea fish. To this end, the jacket 11 includes a squid torso 17 and tentacles 18 extending rearward from the torso 17. Reflective eyes 20 may be positioned on the jacket 11 proximate at a juncture of the torso 17 and the tentacles 18. Fins 21 extend outward from the torso 17.

Figure 2:
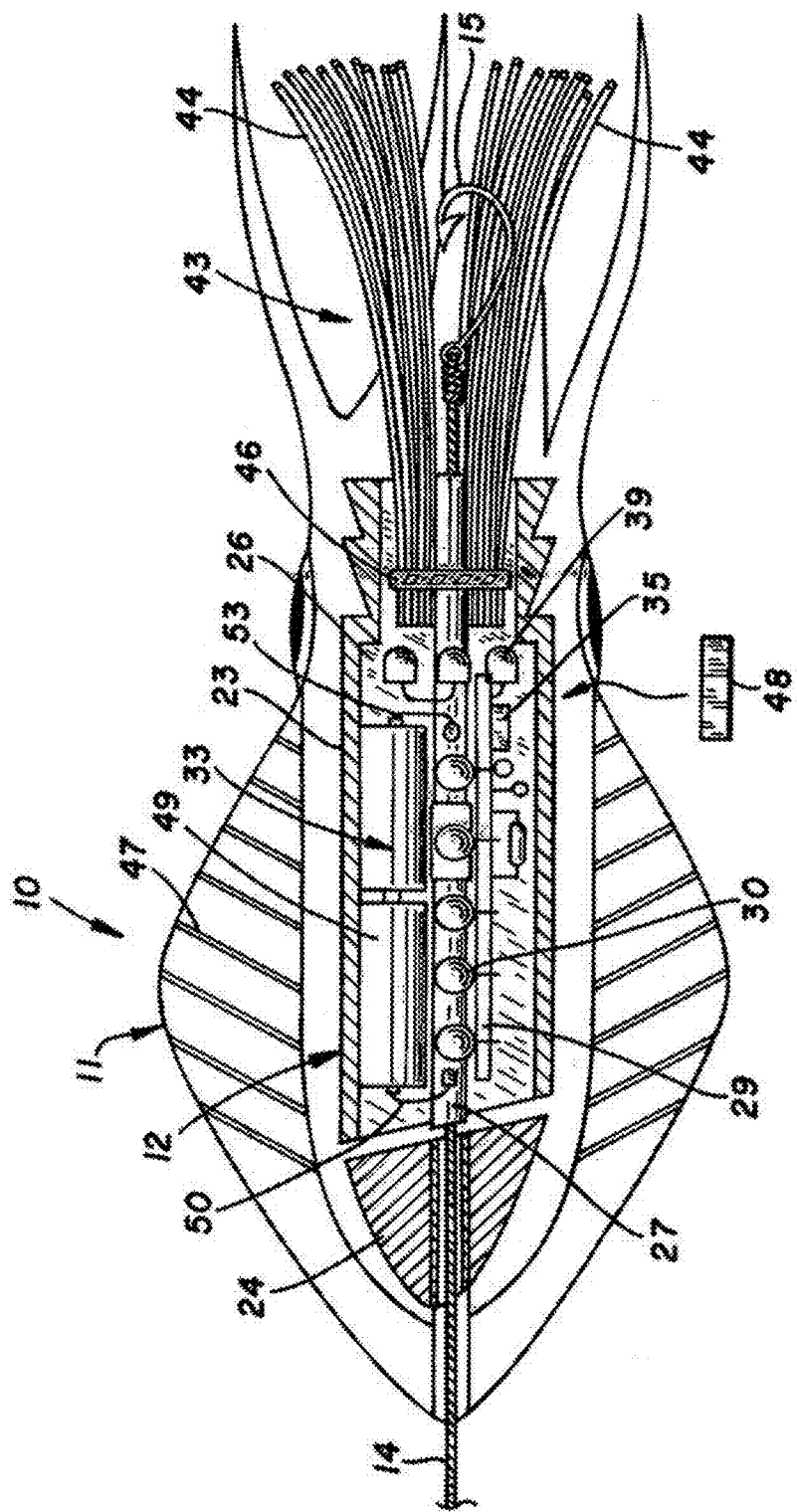
FIG. 2 is a view partially in section of the deep sea fishing lure of FIG. 1 so as to enable illustration of the interior components thereof.

More particularly with reference to FIG. 2, the lure body 12 is shown in sectional view for purposes of illustration. The lure body 12 includes a light-transmissive housing 23, which may have a generally cylindrical shape. The housing 23 has sidewalls that define an interior space for accommodation of the lure components.

A weight 24 can be positioned a forward end of the lure body 12. The amount of the weight can be selected to provide the deep sea fishing lure 10 with sufficient mass to facilitate descent of the deep sea fishing lure 10 to a desired depth. The weight 24 can be removably mounted with respect to the lure body 12. In certain embodiments, the weight 24 may be positioned inside of the jacket 11.

The interior of the housing 23 may be filled or potted solid with a clear polyester resin 26 to hold the various components in place as well as to protect these components from the effects of high pressure at sea depths and from the corrosive effects of salt water.

A metal leader tube 27 may be centrally positioned in the housing 23 and serves as an anti-chaffing conduit for the leader wire 14. The leader wire 14 passes through the leader tube 27 and corresponding openings in the weight 24 and the jacket 11.

Figure 4:
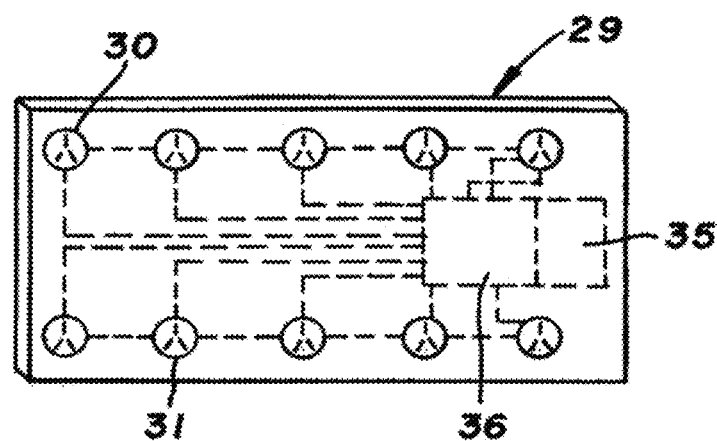
FIG. 4 is a schematic plan view of the first circuit board having first and second banks of light emitting diodes.

A first mounting board 29 is located inside the housing 23. As illustrated in FIG. 4, the first mounting board 29 carries a first linear bank of lights 30 and a second parallel bank of lights 31. Each bank of lights includes a series of lights. In certain embodiments, each bank of lights includes five lights and each of the lights includes a light emitting diode.

The first mounting board 29 is connected to a battery pack 33 through a switch 35. A sequencing flasher module 36 is connected to the first mounting board 29 and connected to the first and second light banks 30, 31.

The sequencing flasher module 36 controls sequential flashing or blinking of the lights of the first and second light banks 30, 31. In a preferred embodiment, the light emitting diodes flash sequentially from the rear toward the front alternating from one bank to the other. The lights can be colored, respectively, in each bank, white, blue, green, orange and red.

In another embodiments of the invention, the lights may be configured to light up different colors depending on the environmental conditions under which the deep sea fishing lure 10 is intended to be used. For example, different illumination colors may be used when it is intended for the deep sea fishing lure 10 to be used during day as opposed to night. In certain embodiments, it may be preferable for the lights to illuminate red when the deep sea fishing lure 10 is used for fishing during the day and illuminate green when the deep sea fishing lure 10 is used for fishing during the night.

It is also possible for different light illumination colors to be used when the deep sea fishing lure 10 is used for fishing at relatively shallow depths as compared to relatively deep depths. For example, the color red may be used at relatively shallow depths and the color green may be used at relatively deep depths.

It is also possible to use bi-color LEDs that illuminate in different colors depending on the polarity of the current that is applied to the LEDs. For example, the bi-color LEDs may alternatively illuminate red and green. The power switch 35 may be configured to alternate the polarity of the current to the LEDs to thereby control the illumination color.

In yet another embodiment, multi-color LEDs may be used in the deep sea fishing lure 10. One such multi-color LED illuminates red, green and blue depending on the voltage that is applied to the multi-color LEDS. The power switch 35 may be configured to pass different voltages of current to the LEDs to thereby control the illumination color.

Alternatively, the deep sea fishing lure 10 is fabricated with a series of LEDs that correspond to each of the colors in which illumination is desired. Operation of the different series of LEDs may be controlled by the power switch 35 that includes settings for off and each of the illumination colors.

The lure body 12 can have outwardly protruding bumps indicated in phantom at 37 in FIG. 1, in the vicinity of the banks of lights 30, 31 to magnify the lights. In certain embodiments, the LEDs are driven by a dot display driver. The dot display driver may be connected to a controller that causes a periodic voltage ramp, which provides the lights 30, 31 with a rippling pattern. In certain embodiments, the voltage ramp may be caused by capacitor discharge through a resistor RC circuit. The capacitor discharge may be triggered by a 555 type timer.

In certain embodiments, the tail lights are driven by a different dot display driver than the lateral lights. Using a different dot display driver for the tail lights and the lateral lights enables different colors to be simultaneously illuminated by the tail lights and the lateral lights, respectively.

Additionally, using different the dot display driver for the tail lights and the lateral lights enables different illumination patterns or cycles to be utilized such that the tail lights and the lateral lights are not illuminated in sync.

As installed in the housing 23, the first mounting board 29 is positioned to substantially span a width thereof with the banks of light emitting diodes parallel to the longitudinal axis of the cylinder. The light emitting diode banks 30, 31 may be spaced apart sufficiently on the circuit board 29 such that they are visible through the wall of the housing 23 substantially 360 degrees around it.

Figure 5:
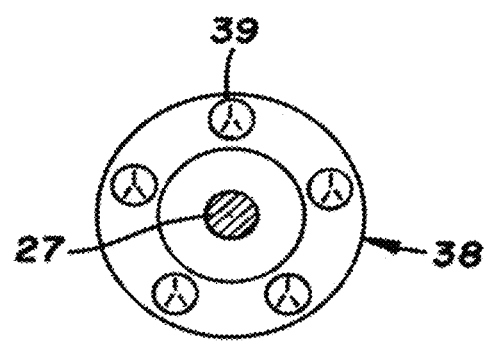
FIG. 5 is a schematic plan view of the second circuit board carrying a circular bank of light emitting diodes.

A second mounting structure or board 38 shown schematically in FIG. 5 is installed toward a rear of the housing 23. The second mounting board 38 carries a third bank of lights comprised as a circular array of five light emitting diodes 39. In certain embodiments, the lights 39 face aft.

The second mounting board 38 is also connected through the switch 35 to the battery pack 33 for power as well as to the flasher module 36 so that the lights 39 flash in sequence. The lights 39 could alternatively be connected to a separate flasher module. The lights 39 can be colored similar to the lights on the first mounting board 29.

A fiber optic bundle 43 may be attached to the housing 23 and extend outward of it. As illustrated in FIG. 2, the fiber optic bundle 43 includes a plurality of individual fiber optic strands 44 bunched together and held by a band 46 surrounding the central shaft 27. The interior ends of the fiber optic strands are located in close proximity to the light emitting diodes 39 of the second mounting board 38.

The outer ends of the individual fiber optic strands 44 extend out through the aft end of the housing 23 and spread apart to form a three dimensional fan-type formation. Light from the light emitting diodes 39 is transmitted through the fiber optic stands to the outer ends presenting an illumination pattern attractive to the prospective game fish. Additional fiber optic strands 47 can be embedded in fins 21 of the squid jacket to transmit light from housing 23 to the ends of the strands 47.

On and off operation of the lure light display may be controlled at the switch 35. In certain embodiments, the switch 35 is a magnetically actuated reed switch as is known in the art. A permanent magnet 48 can be moved into close proximity to the switch 35 to toggle the switch circuit between "on" and "off" positions. The magnet 48 is positioned exteriorly to the housing 23 and is accordingly non-invasive.

In another embodiment, the deep sea fishing lure 10 may be activated when the deep sea fishing lure 10 contacts the water. A variety of water-activated switches may be used in conjunction with the deep sea fishing lure 10. An important criterion when selecting the water-activated switch is that it be suitable for use at the pressures typically experienced at the depths in which the deep sea fishing lure 10 is intended to be used.

In one configuration, the water acts as a resistor on the base of a PNP bipolar resistor. The output voltage goes high when the current flows to thereby cause illumination of the lights. The high voltage is used to enable a 555 type timer by pulling reset high.

In another configuration, the light circuitry includes no on/off switch, which simplifies the structure of the deep sea fishing lure 10 by reducing the number of components that could potentially fail when the deep sea fishing lure 10 is subjected to very large pressures when used at depths that are relatively far beneath the surface of the water.

In such a configuration, the light circuitry may be configured to turn off when the deep sea fishing lure 10 is connected to a charging system. Thereafter, when the deep sea fishing lure 10 is disconnected from the charging system, the light circuitry turns on.

Another advantage of this configuration is this configuration is that it minimizes the potential of the battery not being charged when it is desired to use the deep sea fishing lure 10 because the illumination of the light circuitry reminds the user to connect the deep sea fishing lure 10 to the charging circuitry when use is completed.

The battery pack 33 may include at least one battery 49 and a recharging circuit. The leader tube 27 may be formed from brass or another electrically conductive metal or other material.

Because of the nature of the deep sea fishing lure 10, it may be desirable to permanently mount the battery in the lure body 12. In such situations, the battery 49 may be rechargeable. An example of one suitable type of rechargeable battery is nickel metal hydride.

An example of another type of rechargeable battery that can be used in conjunction with the deep sea fishing lure 10 is a lithium polymer battery. The energy density of the lithium polymer battery is greater than many other types of rechargeable batteries. Additionally, the lithium polymer batteries are lighter than many other types of rechargeable batteries.

Another advantage of lithium polymer batteries is that they typically have a built in circuit that prevents over discharge and thereby reduces the potential of damage to the lithium polymer batteries. A disadvantage of the lithium polymer batteries is that they require a special charge circuit that typically runs off of a 5 volt power source such as a charger that is used in conjunction with a conventional mobile phone.

A first lead wire 50 is connected between one end of the leader tube 27 and one end of battery pack 33. A second lead wire 53 is connected between the other end of leader tube 27 and the battery pack 33. One lead wire is connected to the positive (+) end of the battery pack, and the other is connected to the negative (−) end of the battery pack.

Figure 3:
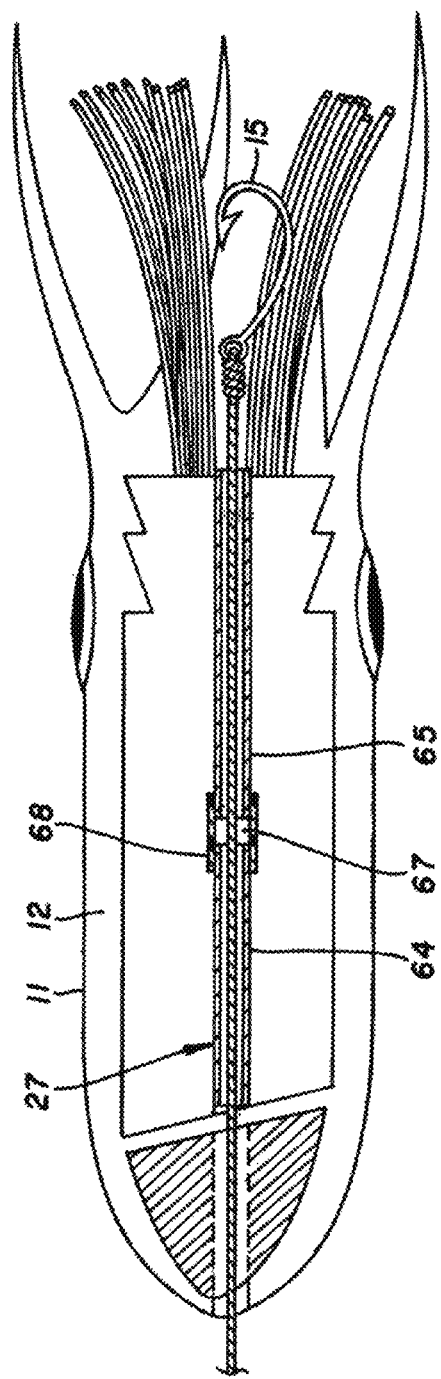
FIG. 3 is another view of the deep sea fishing lure of FIG. 1 with components and parts removed for the purpose of clarification in order to show the central leader tube of the deep sea fishing lure which forms a part of the recharging circuit for the battery pack.
Figure 8:
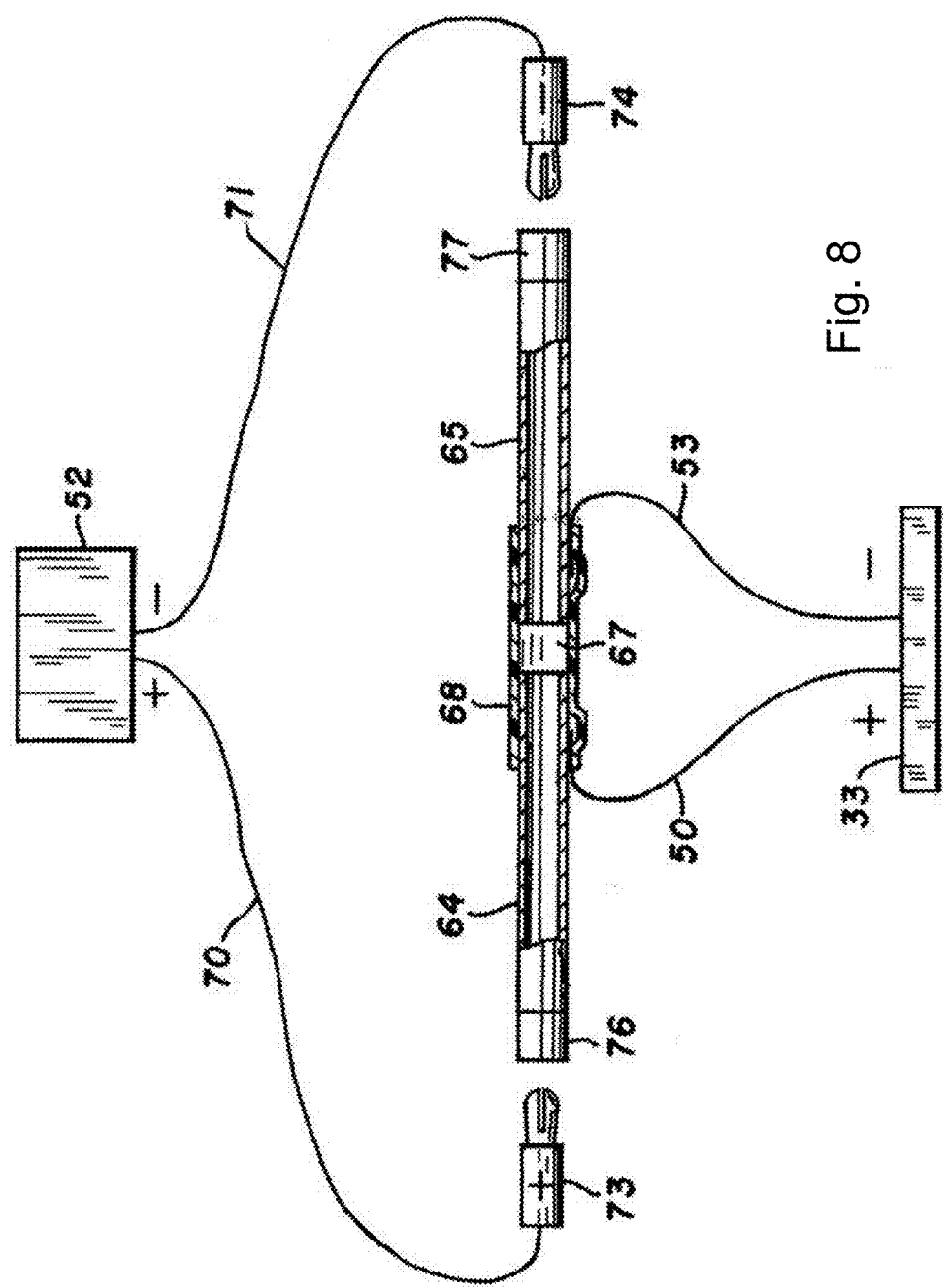
FIG. 8 illustrates the battery charger connection circuit of the deep sea fishing lure.

FIGS. 3 and 8 more particularly depict the connection between the battery pack 33 and a battery charger 52. The leader tube 27 is divided into a forward component 64 and an aft component 65. The forward and aft components 64, 65 are axially spaced apart by an air gap 67. A tubular insulator-spacer 68 may be used proximate adjacent ends of the forward and aft components 64, 65 to maintain them spaced apart so as to maintain gap 67.

As shown in FIG. 8, the battery charger 52 has first and second output leads 70, 71 which can be designated positive and negative as indicated. A first banana plug 73 is attached to the end of the first output lead 70. A second banana plug 71 is attached to the end of the second output lead 71. The banana plugs fit into and makes electrical connection with the outer ends of the leader tube components 64, 65.

The ends of the leader tube components 64, 65 can be color-coded to indicate proper connection with the battery charger output leads 70, 71. In certain embodiments, the forward end of the forward leader tube component 64 can have a red colored band 76 indicating a positive electrical connection with the banana plug 73 (which also can be correspondingly colored red) connected to the positive output terminal of the battery charger 52.

In certain embodiments, the aft end of the aft leader tube component 65 can have a black colored band 77 indicating a proper connection to the banana plug 74 (which can also be colored black) connected to the negative terminal of the battery charger 52.

When it is time to recharge the batteries 49, the jacket 11 and the leader 14 are removed from the lure body 12. The battery charger leads 70, 71 are connected to the battery pack for recharging the batteries by connecting the banana plugs 73, 74 to the proper ends of the leader tube components 64, 65.

This is done while carefully observing the proper electrical polarity which is facilitated by the color coding. The air gap spacing 67 and the alignment of the leader tube components are maintained by the spacer 68 which can be a semi-rigid jacket of polyolefin heat-shrink tubing.

A rectifier diode can be provided in the internal charging circuit to prevent reverse current through the charging leads when the deep sea fishing lure 10 is in use and conductive leader wire or salt water short circuits the leader tube components, and also to prevent damage to the batteries 49 if the leads 70, 71 of the external charger are accidentally connected in reverse.

Another option that reduces the complexity of the light circuitry is to directly attach the brass type used in the recharging circuit to the circuit board. Attaching the brass tube directly to the circuit board may enhance the accuracy in which the components are incorporated into the acrylic molded body and thereby are believed to outweigh the challenges associated with directly soldering the brass tube to the printed circuit board.

In an alternative embodiment, the deep sea fishing lure 10 includes two charging leads that are separate from the leader tube 27 and that are accessible from an outer surface of the deep sea fishing lure 10. The charging leads may be accessible from an outer surface of the deep sea fishing lure 10 without the need to remove jacket 11 and/or the leader 14 from the lure body 12.

These charging leads may be configured to minimize direct contact of the charging leads as such direct contact could damage the lighting components in the deep sea fishing lure 10. An example of one configuration of the charging leads is cylindrical similar to a conventional headphone plug.

In another embodiment of the invention, the battery 49 is charged using an inductive charging system. An advantage of using the inductive charging system to charge the battery 49 is that it is not necessary to provide charging leads on a surface of the deep sea fishing lure 10 because such charging leads can corrode from exposure to the components in sea water. Additionally, incorrect attachment of the charging leads to the power supply can damage the light components in the deep sea fishing lure 10.

Figure 6:
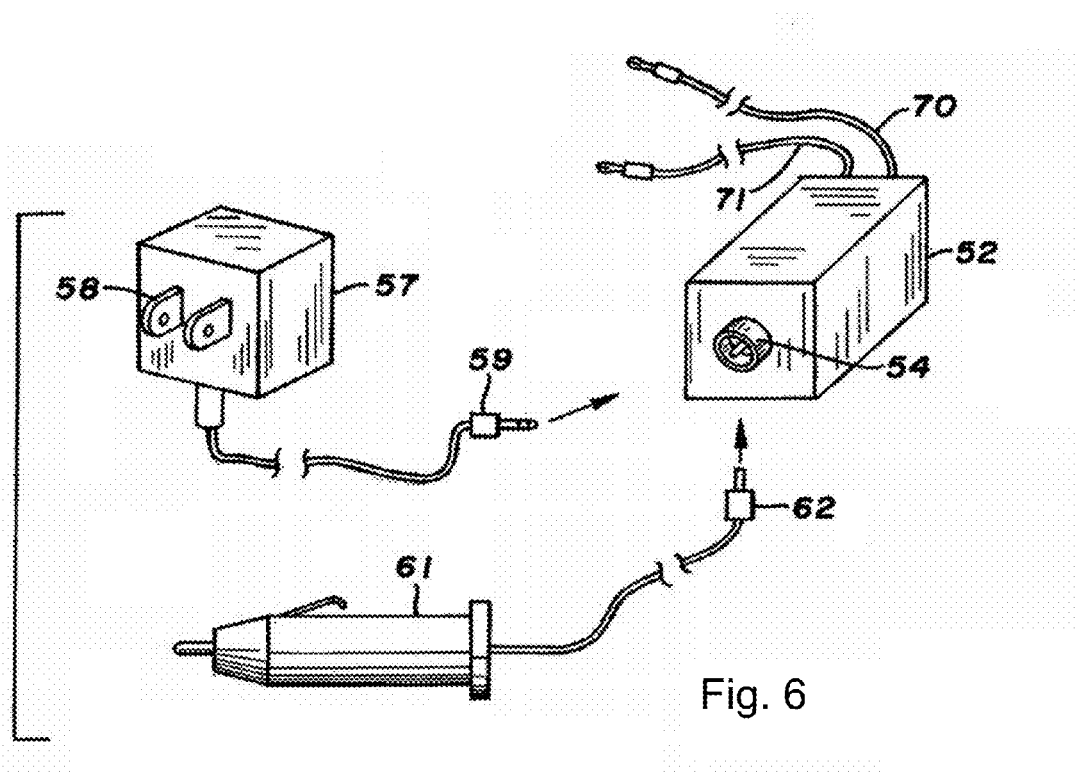
FIG. 6 shows the battery charging assembly for the battery pack of the deep sea fishing lure of the invention.

FIG. 6 shows a battery charging assembly for recharging the batteries 49 of the battery pack 33. The charger assembly includes a battery charger 52 having a 12-volt DC input receptacle socket 54 and a converter to 5-volt DC at output terminals 70, 71. The charger assembly also includes a 110-volt alternating current to 12-volt DC converter 57. The 12 volt charging capability may be desirable because it is commonly found in the electrical systems utilized in many automobiles and boats.

The converter 57 has the usual prongs 58 to plug into a normal 110-volt wall socket. The converter 57 has a 12-volt output plug 59 compatible with the socket 54 on the input of the charger unit 52. In addition, the battery charging assembly includes a 12-volt adapter for connection to a 12-volt battery circuit as is found aboard a sport fishing boat.

A plug 61 fits into the usual 12-volt socket found in connection with a 12-volt system such as the cigarette lighter socket in a sport fishing boat or an automobile. The plug 61 is connected to a smaller plug 62 which will provide the 12-volt output. Plug 62 is compatible with receptacle socket 54 on the charger 52.

In use of the charger, the battery pack 33 can be recharged using a 12-volt supply from boat or automobile, or from a 110-volt common household or other building current. The fully charged lure 10 is prepared for fishing in the usual fashion. The lure jacket 11 is installed over the lure body 12. The jacket 11 may be interchangeable with other jackets so that the deep sea fishing lure 10 can take on the appearance of various aquatic species for the purpose of baiting the targeted sport fish.

In one possible configuration, the illumination of the deep sea fishing lure 10 is turned "on" by bringing a magnet 48 in close proximity to the switch 35. The deep sea fishing lure 10 is lowered into the water to a depth necessary to attract the game fish. The illumination provided by the light emitting diodes is visible 360° around the deep sea fishing lure 10 at any depth. Additional illumination is provided by the circular bank of light emitting diodes and the transmission of light through the fiber optic bundle 43 to the rear of the deep sea fishing lure 10.

Figure 7:
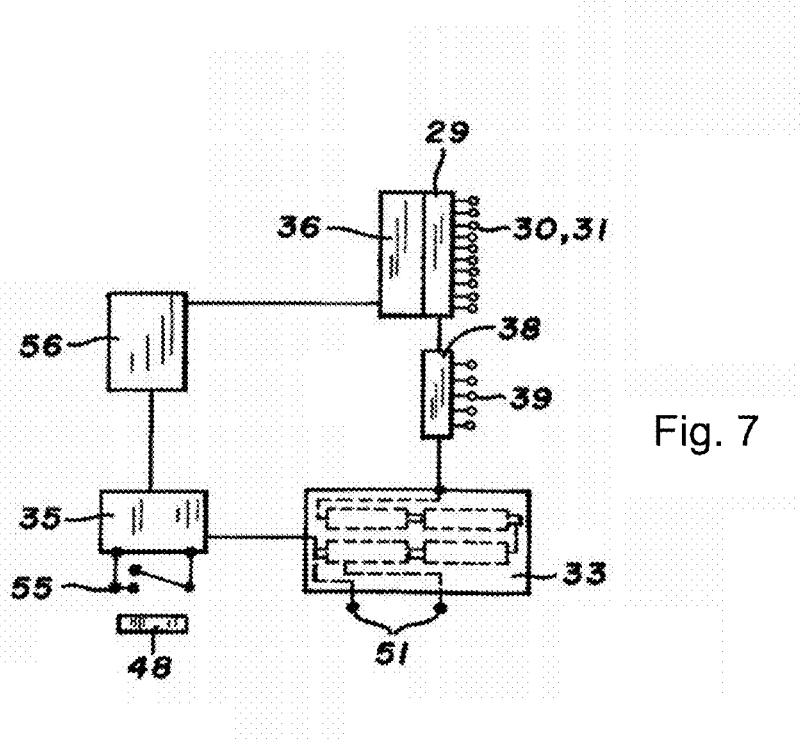
FIG. 7 illustrates an exemplary circuit for the light display of the deep sea fishing lure.

An example of a light display circuit is schematically depicted in FIG. 7. The reed switch assembly 35 includes a magnetically operated switch element 55 actuated by a permanent magnet 48. The switch assembly 35 is connected to the power supply 33. The first and second circuit boards 29, 38 are connected to flasher modules 36, 41 each comprised as an LM3914 display driver to sequentially blink the light emitting diodes 30, 31, 39 of each of the circuit boards 29, 38. A LMC timer IC 56 may be connected between the switch 35 and the flasher modules 36, 41 to assure that both displays of light banks cycle with a repetition rate that is independent of battery voltage.

Another configuration of the deep sea fishing lure 10 includes light circuitry that is associated with a programmable micro-controller. An advantage of using the programmable micro-controller is that it provides enhanced ability to adjust the light display sequencing and timing.

Another advantage of the programmable micro-controller is that the number of parts in the light circuitry is reduced because the logic can be programmed as opposed to controlled using a combination of individual circuit elements. Yet another advantage of this configuration is that the same basic architecture can be used in lures that are intended for use in conjunction with different types of fish such as a squid lure and a bass lure.

When the lure is adapted for use in conjunction with attracting different types of fish, the outer shape may take alternative forms than the form illustrated in the figures in this patent application. For example, bass may be attracted when the outer portion of the lure has a shape that resembles a frog.

Figure 9:
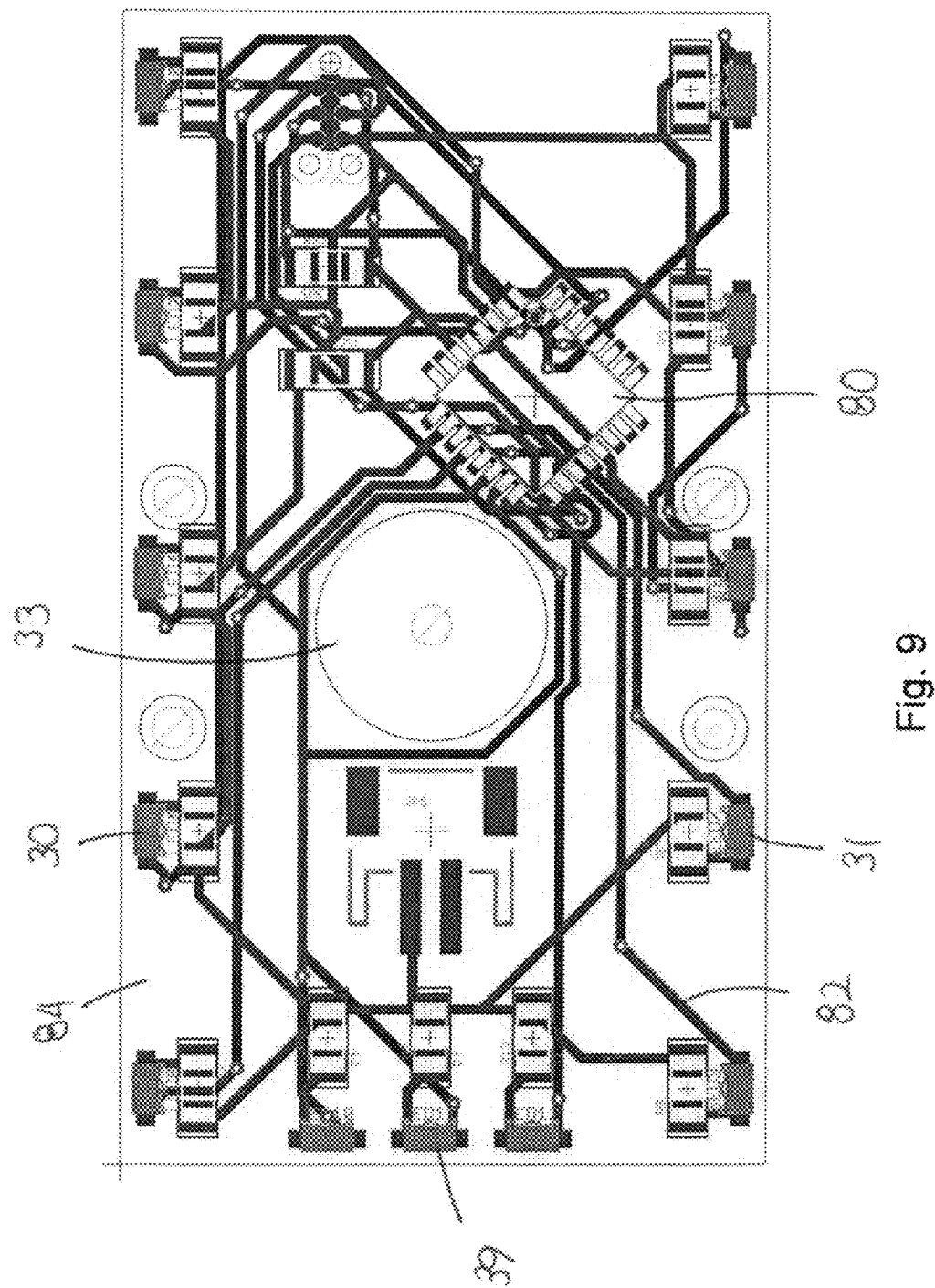
FIG. 9 is a schematic illustration of interconnection of lighting system components in an embodiment of the deep sea fishing lure.

FIG. 9 illustrates an electrical circuit diagram for an embodiment of the invention in which lights 30, 31, 39 are interconnected to a microprocessor 80, the charging circuit, the water sensing circuit and the battery. This embodiment includes a plurality of light 30, 31 positioned on opposite sides thereof and a plurality of lights 39 positioned proximate an end thereof.

Each of the lights 30, 31, 39 is operably connected to the microprocessor 80 using conductive traces 82. While it is illustrated that some of the lights on the sides 30, 31 and ends 39 are interconnected, it is also possible for all of the lights 30, 31, 39 to be separately connected to the microprocessor 80.

Even though separately operably connecting the lights 30, 31, 39 to the microprocessor 80 may increase the number of conductive traces 82 on the circuit board 84, such a configuration enables the separately connected lights 30, 31, 39 to be individually operated such as in a wave configuration, which may be effective to increase the attractiveness of the deep sea fishing lure 10 to fish that are in proximity to the deep sea fishing lure 10.

The circuit diagram illustrates a single set of lights mounted along the sides and one end thereof. As discussed herein, such lights may be configured to illuminate in more than one color. In an alternative embodiment, a separate set of lights may be provided for each of the illumination colors.

For example, one set of red lights and one set of green lights may be provided on the circuit board 84. A person of skill in the art will appreciate that providing multiple sets of lights on the circuit board 84 would increase the number of conductive traces 82 that are provided on the circuit board 84 to operably connect the lights 30, 31, 39 to the microprocessor 80.

Figure 10:
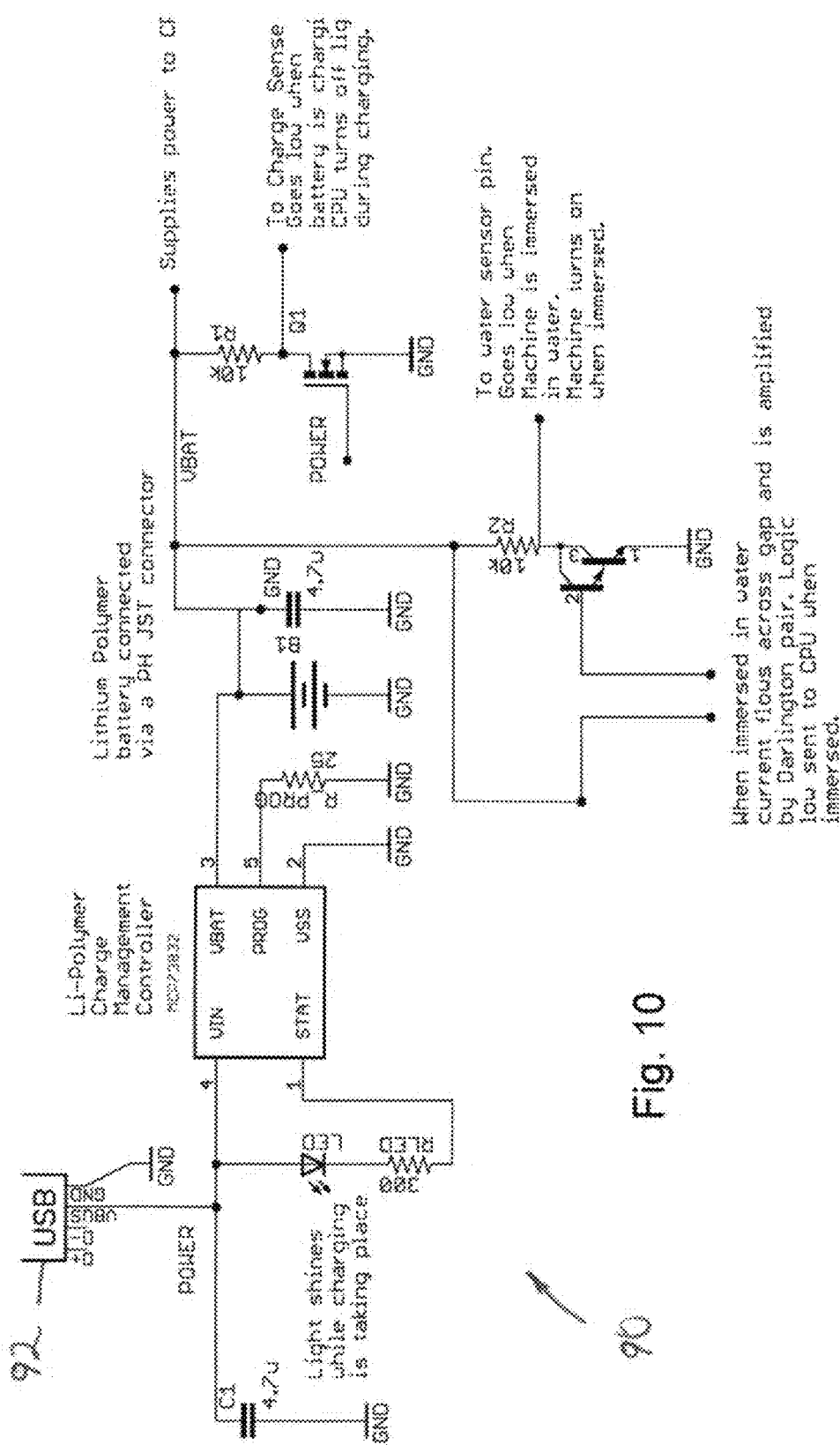
FIG. 10 is a schematic illustration of a charging circuit for use in conjunction with an embodiment of the deep sea fishing lure.

FIG. 10 illustrates an embodiment of a charging circuit 90 that can be used in conjunction with deep sea fishing lure 10. The charging circuit 90 illustrates that the presence of an external programming connection 92, which is identified a USB. The external programming connection 92 may be desirable to facilitate changing different light operational features such as the illumination color and the illumination pattern.

Despite the advantages of the external programming connection 92, where the deep sea fishing lure 10 is intended for use a significant depths, it may be undesirable to include the external programming connection 92 to minimize the potential of operational issues with the deep sea fishing lure 10.

Figure 11:
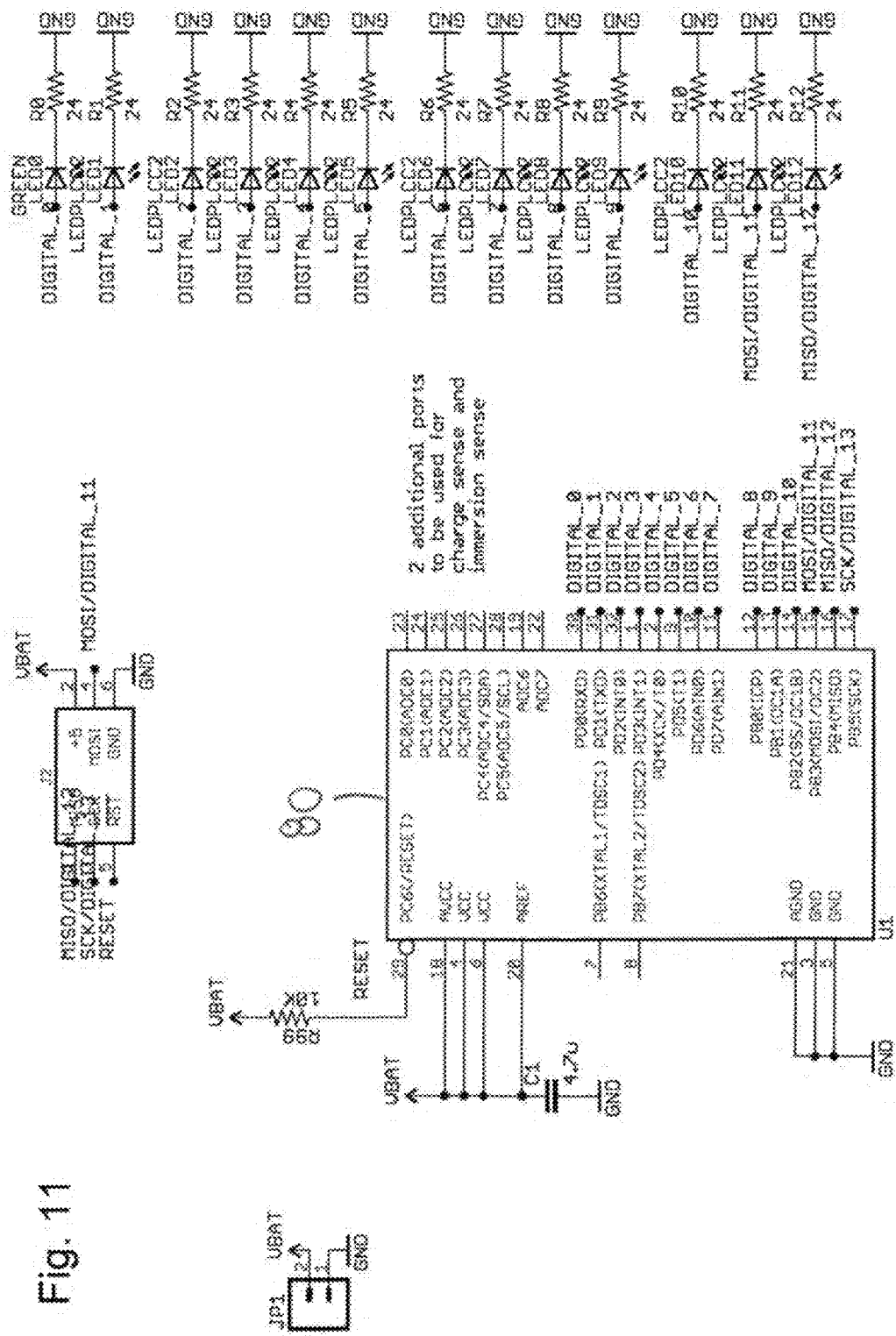
FIG. 11 is a schematic illustration of the interconnection of the lighting system components in an embodiment of the deep sea fishing lure.

FIG. 11 illustrates electrical connections between the microprocessor 80, lights (identified as DIGITAL_0 through DIGITAL_10) and battery in the deep sea fishing lure 10. Rather than using lines to show the interconnection of the elements, this diagram provides a name such as DIGITAL_0 to indicate each end of the electrical connection.

In another embodiment, the illumination color is set when the deep sea fishing lure 10 senses water. When the deep sea fishing lure 10 is disconnected from the charger, the deep sea fishing lure 10 may periodically illuminate the lights in each of the available colors. In certain embodiments, each color is sequentially illuminated for between about 1 second and about 5 seconds.

The rate of flashing may be done at a rate that is sufficiently slow so that the person using the deep sea fishing lure 10 can see a desired color illuminate during the flashing process and then at least partially submerge the deep sea fishing lure 10 in water to set the illumination color that is desired to be used when fishing.

The at least part of the deep sea fishing lure 10 that needs to be submerged in water is the portion of the deep sea fishing lure 10 on which the water sensor is located. As discussed in other portions of this application, the water sensor may include two contacts mounted in a spaced-apart configuration such that the presence of water over both of the contacts completes the circuit.

In another embodiment, the illumination color is set by which of the charging leads is first disconnected from the deep sea fishing lure 10. In this embodiment, each of the charging leads may include a label notifying the person using the deep sea fishing lure 10 that disconnection of this charging lead first will cause the deep sea fishing lure 10 to illuminate in a particular color once the deep sea fishing lure 10 is submersed in water.

The deep sea fishing lure 10 may include a microcontroller that controls the operation of the lights in the deep sea fishing lure 10. An advantage of the microcontroller to control the operation of the lights is that it is extremely malleable such that the operational characteristics of the lights can be readily varied. For example, the microcontroller enables the light sequencing and speed to be controller.

The deep sea fishing lure may include two input mechanisms that are operably connected to the microcontroller. In certain embodiments, the input mechanism includes a submersion sensor and a charge sensor. The submersion sensor is capable of detecting when the deep sea fishing lure 10 is immersed in water. The charge sensor is capable of detecting when the deep sea fishing lure 10 is being charge.

If the deep sea fishing lure 10 is not charging and is not submerged, the microcontroller goes into a deep sleep. The deep sleep minimizes power consumption from the lighting system and thereby extends battery life. This mode would be utilized when the deep sea fishing lure 10 is being shipped or stored.

The microcontroller 80 periodically checks to determine if there is a change of status. In certain embodiments, the microcontroller 80 may check the status of the system about every 2 seconds. The duration between status checks may be lengthened to decrease the drain on the battery 33 caused by the status checks.

The microcontroller 80 may cause at least one of the lights 30, 31, 39 on the deep sea fishing lure 10 to illuminate if it is determined that there is a change in the status of the deep sea fishing lure 10 from when the status was previously checked. In certain embodiments, the illumination of the deep sea fishing lure 10 to indicate a status change can be distinct from the illumination of the deep sea fishing lure 10 during the normal operational mode.

If the deep sea fishing lure 10 is not charging and is submerged, the microcontroller 80 is on such that the microcontroller 80 can control the operation of the lights 30, 31, 39. This is the mode of the deep sea fishing lure 10 when the deep sea fishing lure 10 is used in conjunction with fishing.

If the deep sea fishing lure 10 is charging and not submerged, the microcontroller 80 turns off all lights 30, 31, 39. The deep sea fishing lure 10 may include a light to indicate that the deep sea fishing lure 10 is charging. The charging indicator light may be separate from the other lights in the deep sea fishing lure 10. Alternatively, the charging indicator light may be one of the illumination lights in the deep sea fishing lure 10.

If the charging indicator light is one of the illumination lights 30, 31, 39 in the deep sea fishing lure 10, it should illuminate in a manner that is distinct from the manner in which the illumination lights illuminate so that a person viewing the deep sea fishing lure 10 could readily appreciate the difference between the charging indicator mode and the typical illumination mode.

When in the charging mode, the microcontroller 80 may enter an intermediate sleep mode. When in the intermediate sleep mode, the microcontroller 80 ensures that the charge circuit charges the battery while the microcontroller 80 power consumption does not appreciably affect the charging current and voltage calculations. The charging mode could be viewed as the deep sea fishing lure's normal mode when it is plugged into a charger at home, in a vehicle or on a boat.

When the microcontroller 80 is in the intermediate sleep mode, the microcontroller 80 may be configured to periodically check the charging status. In certain embodiments, the charging status is checked approximately every ¼ second.

If the microcontroller 80 senses that deep sea fishing lure 10 is charging and submerged, the microcontroller 10 enters an error mode because it is not possible for the deep sea fishing lure 10 to be charging while the deep sea fishing lure 10 is submerged in water. The error mode causes at least one of the lights 30, 31, 39 to illuminate in a unique pattern to indicate that the deep sea fishing lure 10 is experiencing an error. In certain embodiments, the at least one of the lights 10 may continuously flash in a green color to indicate that the deep sea fishing lure 10 is in the error mode.

In another embodiment of the invention, the deep sea fishing lure 10 includes the ability to wirelessly communicate with a controller that is separate and distinct from the deep sea fishing lure 10.

This communication could be in a single direction, which enables the operational aspects of the deep sea fishing lure 10 to be programmed. Alternatively, the communication could be in two directions such that the transmissions from the deep sea fishing lure 10 could report ambient conditions that are experienced during the use of the deep sea fishing lure 10.

An example of one protocol that could be used to provide communication between the deep sea fishing lure 10 and the controller is identified as Bluetooth protocol, which would permit two directional flow of data between the deep sea fishing lure 10 and the controller.

The components in the deep sea fishing lure 10 that are associated with sending and receiving data in the Bluetooth protocol may be operably connected to the microprocessor 80. An advantage of using the Bluetooth protocol is that the operational characteristics of the deep sea fishing lure 10 may be controlled using a variety of devices that also include components that are able to send and receive data using the Bluetooth protocol. Examples of several types of devices that can include this functionality include computers, tablet computers and handheld communication devices.

An advantage of using a wireless communication protocol that facilitates bidirectional communication is that conditions that are experienced when the deep sea fishing lure is being used can be monitored. In certain embodiments, the wireless communications occurs while the device is being used.

In other embodiments, the data that is monitored while the deep sea fishing lure 10 is being used is stored in the deep sea fishing lure 10. Thereafter, the deep sea fishing lure 10 may be moved into proximity with the controller and the stored data is transferred from the deep sea fishing lure 10 to the controller.

Examples of data that can be monitored and/or recorded include the ambient pressures and/or temperatures that are experienced during the use of the deep sea fishing lure 10 as well as the ambient pressures and/or temperatures that are experienced when the deep sea fishing lure 10 is struck by a fish.

The deep sea fishing lure 10 can include the capability to emit sound. This emitted sound may be used to alert fish of the presence of the deep sea fishing lure 10. In certain embodiments, the sound is utilized to cause the fish to see the light that is emitted from the deep sea fishing lure 10.

The sound can be periodically emitted by the deep sea fishing lure 10. Periodically emitting the sound alerts fish of the presence of the deep sea fishing lure 10 while minimizing the potential that the fish would be scared away from the deep sea fishing lure 10 caused by the sound being continuously emitted by the deep sea fishing lure 10.

As described above, the deep sea fishing lure 10 may be used at depths of between about 150 feet and about 200 feet. To provide the outer flexible portions of the deep sea fishing lure 10 with sufficient movement such that fish are attracted to the deep sea fishing lure 10, it may be desirable for the deep sea fishing lure 10 to be moved in the water.

In certain embodiments, the movement of the deep sea fishing lure 10 through the water is at a rate of greater than about 3 knots. In other embodiments, the movement of the deep sea fishing lure 10 through the water is at a rate of between about 5 knots and about 6 knots.

When the deep sea fishing lure 10 is moving through the water on a line that extends from a boat on the surface of the water, there is a tendency of the deep sea fishing lure 10 to raise to the surface of the water.

To enhance the likelihood of the deep sea fishing lure 10 remaining at the desired depth, weights may be attached to the deep sea fishing lure 10. Alternatively or additionally, the weights may be attached to the line to which the deep sea fishing lure is attached. In certain embodiments, the total amount of the weights may be greater than about 5 pounds.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A deep sea fishing lure comprising:
   a lure body comprising a housing with sidewalls made of a generally light-transmissive material;
   a plurality of lights mounted in the housing, wherein each light in the plurality of lights is capable of emitting at least two colors, wherein the plurality of lights comprises;
      a linear bank of lights mounted in the housing parallel to an intended direction of travel of the deep sea fishing lure through a body of water and wherein light emitted from the linear bank of lights is viewable through the light-transmissive sidewalls; and
      a circular bank of lights mounted in the housing proximate an aft end thereof and wherein light emitted from the circular bank of lights is viewable through the light-transmissive sidewalls; a fiber optic bundle connected to the housing proximate the circular bank of lights and extending from the aft end of the housing;
   a power source mounted with respect to the housing; and
   a controller operably connecting the power source to the plurality of lights for controlling which of the at least two colors are emitted by the plurality of lights.

2. The deep sea fishing lure of claim 1, wherein the deep sea fishing lure is capable of being used at pressure of between about 20 atmospheres and about 100 atmospheres without experiencing damage.

3. The deep sea fishing lure of claim 1, and further comprising a charging sensor and a submersion sensor that are each operably connected to the controller, wherein the charging sensor is capable of sensing when the power source is operably attached to an external charging system and wherein the submersion sensor is capable of sensing when the deep sea fishing lure is submerged in water.

4. The deep sea fishing lure of claim 1, wherein the controller controls the color emitted by the plurality of lights by changing a voltage supplied to the plurality of lights, changing a polarity of current supplied to the plurality of lights or combination thereof.

5. The deep sea fishing lure of claim 1, wherein the controller is also capable of causing the plurality of lights to illuminate in a rippling pattern.

6. The deep sea fishing lure of claim 1, wherein the plurality of lights comprise a first set of lights and a second set of lights.

7. The deep sea fishing lure of claim 1, wherein the controller is water activatable.

8. The deep sea fishing lure of claim 1, wherein the plurality of lights comprise light emitting diodes.

9. The deep sea fishing lure of claim 8, wherein the at least two colors of light comprise a first color and a second color, wherein the first color is adapted for fishing during day time and wherein the second color is adapted for fishing during night time.

10. The deep sea fishing lure of claim 9, wherein the at least two colors comprise green and red.

11. The deep sea fishing lure of claim 1, and further comprising a removable jacket installed over and substantially covering the lure body, wherein the removable jacket is fabricated from a light-transmissive material and is configured to visually resemble a bait attractive to fish.

12. A deep sea fishing lure comprising:
a lure body comprising a housing with sidewalls made of a generally light-transmissive material;
a plurality of lights mounted in the housing, wherein each light in the plurality of lights is capable of emitting at least two colors;
a leader tube that at least partially extends through the housing, wherein the leader tube comprises two tube sections, wherein an air gap is provided between the tube sections, wherein each of the tube sections are connected to a circuit board to which the plurality of lights are attached and wherein the tube sections are attached to the power source for charging the power source;
a power source mounted with respect to the housing; and
a controller operably connecting the power source to the plurality of lights for controlling which of the at least two colors are emitted by the plurality of lights.

13. The deep sea fishing lure of claim 12, tube sections are color coded to facilitate accurately attaching a charging system to the tube sections.

14. A method of deep sea fishing comprising:
providing a deep sea fishing lure comprising a lure body, a plurality of lights, a power source and a controller, wherein the lure body comprises a housing with sidewalls made of a generally light-transmissive material, wherein the plurality of lights is mounted in the housing, wherein each light in the plurality of lights is capable of emitting at least two colors, wherein the power source is mounted with respect to the housing and wherein the controller operably connects the power source to the plurality of lights for controlling which of the at least two colors are emitted by the plurality of lights operably attaching at least one of a hook and a leader to the deep sea fishing lure;
attaching the power source to a charging system, wherein the charging system comprises two charging leads and wherein an order in which the charging leads are disconnected from the power source causes selection of one of the at least two colors that will be emitted from the plurality of lights;
determining environmental conditions in which the deep sea fishing lure will be used;
using the controller to cause the plurality of lights to emit one color of the at least two colors based upon the determined environmental conditions; and
placing the deep sea fishing lure in a body of water.

15. The method of claim 14, wherein the deep sea fishing lure further comprises a submersion sensor and a charging sensor that are operably connected to the controller.

16. The method of claim 15, wherein the charging sensor causes at least one of the plurality of lights to illuminate to indicate that the deep sea fishing lure is operably attached to a charging system.

17. The method of claim 14, wherein when the power source is disconnected from the charging system, the lights sequentially illuminate in each of the at least two colors and wherein submersion of the deep sea fishing lure when one of the at least two colors is illuminate causes that color to remain on when the deep sea fishing lure remain submerged in the water.

18. The method of claim 14, wherein contacting the deep sea fishing lure with water causes the plurality of lights to emit light.

19. The method of claim 14, wherein the controller controls the color emitted by the plurality of lights by changing a voltage supplied to the plurality of lights, changing a polarity of current supplied to the plurality of lights or combination thereof.

20. The method of claim 14, wherein the controller is also capable of causing the plurality of lights to illuminate in a rippling pattern.

21. The method of claim 14, wherein the at least two colors of light comprise a first color and a second color, wherein the first color is adapted for day time fishing and wherein the second color is adapted for night time fishing.

22. The method of claim 14, wherein the at least two colors comprise green and red.

23. The method of claim 14, wherein the plurality of lights comprises a linear bank of lights and a circular bank of lights, wherein the linear bank of lights is mounted in the housing parallel to an intended direction of travel of the deep sea fishing lure through a body of water and wherein light emitted from the linear bank of lights is viewable through the light-transmissive sidewalls, wherein the circular bank of lights is mounted in the housing proximate an aft end thereof, wherein light emitted from the circular bank of lights is viewable through the light-transmissive sidewalls and wherein the deep sea fishing lure further comprises a fiber optic bundle connected to the housing proximate the second plurality of lights and extending from the aft end.

24. The method of claim 14, and further comprising a removable jacket and a leader tube, wherein the removable jacket is installed over and substantially covering the lure body, wherein the removable jacket is fabricated from a light-transmissive material and is configured to visually resemble a bait attractive to fish and wherein leader tube at least partially extends through the housing.

* * * * *